(12) United States Patent
Nagai et al.

(10) Patent No.: US 8,891,574 B2
(45) Date of Patent: Nov. 18, 2014

(54) POLARIZATION PURITY CONTROL DEVICE AND GAS LASER APPARATUS PROVIDED WITH THE SAME

(75) Inventors: Shinji Nagai, Hiratsuka (JP); Fumika Yoshida, Hiratsuka (JP); Osamu Wakabayashi, Hiratsuka (JP); Kouji Kakizaki, Oyama (JP)

(73) Assignee: Gigaphoton Inc., Tokyo (JP)

( * ) Notice: Subject to any disclaimer, the term of this patent is extended or adjusted under 35 U.S.C. 154(b) by 0 days.

(21) Appl. No.: 13/425,825

(22) Filed: Mar. 21, 2012

(65) Prior Publication Data

US 2012/0177072 A1 Jul. 12, 2012

(30) Foreign Application Priority Data

Aug. 22, 2008 (JP) .................... 2008-213529

(51) Int. Cl.
*H01S 3/22* (2006.01)
*H01S 3/10* (2006.01)
*H01S 3/23* (2006.01)
*H01S 3/225* (2006.01)
*H01S 3/00* (2006.01)

(52) U.S. Cl.
CPC ........... *H01S 3/10061* (2013.01); *H01S 3/2251* (2013.01); *H01S 3/2316* (2013.01); *H01S 3/005* (2013.01)
USPC ............................................. 372/55; 372/57

(58) Field of Classification Search
USPC .................................................. 372/55, 57
See application file for complete search history.

(56) References Cited

U.S. PATENT DOCUMENTS

| 2003/0219056 A1 | 11/2003 | Yager et al. |
| 2005/0068538 A1 | 3/2005 | Rao |
| 2005/0280697 A1 | 12/2005 | Miyagawa |
| 2006/0055834 A1 | 3/2006 | Tanitsu et al. |
| 2007/0222963 A1* | 9/2007 | Goto ............................... 355/71 |
| 2008/0094701 A1* | 4/2008 | Natura et al. .................. 359/483 |
| 2008/0198891 A1* | 8/2008 | Hori et al. ........................ 372/61 |
| 2009/0002673 A1* | 1/2009 | Shinoda .......................... 355/71 |
| 2009/0296089 A1* | 12/2009 | Smith ........................... 356/367 |

FOREIGN PATENT DOCUMENTS

| JP | 2001-223422 | | 8/2001 |
| JP | 2006-73921 A1 | | 3/2006 |
| JP | 2006-165484 | | 6/2006 |
| JP | 2006-179600 A1 | | 7/2006 |
| JP | 2006179600 A | * | 7/2006 |
| JP | 2008-116940 | | 5/2008 |

OTHER PUBLICATIONS

Machine translation of JP 2006-179600 Jul. 2006 Moriya et al.*
Notice of Rejection received from the Japanese Patent Office on counterpart application No. 2008-213529 mailed on Sep. 19, 2012 (3 pages) and English translation (3 pages).

* cited by examiner

*Primary Examiner* — Yuanda Zhang
(74) *Attorney, Agent, or Firm* — Kratz, Quintos & Hanson, LLP

(57) ABSTRACT

A degree of polarization control device includes:
a calcium fluoride crystal substrate for transmitting a laser beam;
a polarization monitor for measuring the degree of polarization of a laser beam transmitted through the calcium fluoride crystal substrate; and
a controller for controlling the rotation angle of the calcium fluoride crystal substrate according to the degree of polarization measured by the polarization monitor;
the calcium fluoride crystal substrate being formed by a flat plate having a laser beam entering surface and a laser beam exiting surface running in parallel with the (111) crystal face, the Brewster angle being selected for the incident angle, the rotation angle around the [111] axis operating as a central axis being controlled by the controller.

6 Claims, 15 Drawing Sheets

POLARIZATION PURITY CONTROL DEVICE AND GAS LASER APPARATUS PROVIDED WITH THE SAME

CROSS-REFERENCE TO RELATED APPLICATIONS

This application is a divisional of prior application Ser. No. 12/545,474, filed on Aug. 21, 2009. This application claims benefit of Japanese Patent Application No. 2008-213529 filed in Japan on Aug. 22, 2008, the contents of which are incorporated by this Reference.

BACKGROUND OF THE INVENTION

The present invention relates to a degree of polarization control device to be used in a semiconductor exposure apparatus having an excimer laser or a molecular fluorine laser and also to a gas laser apparatus provided with the same.
(Exposure Light Source)

In the trend of making semiconductor integrated circuits finer and more integrated, an improved resolution is required for semiconductor exposure apparatus. To meet this demand, efforts are being paid to use shorter wavelength for the laser beam emitted from an exposure light source. Gas laser apparatus are being popularly employed as exposure light sources in place of conventional mercury lamps. KrF excimer laser apparatus for emitting deep ultraviolet rays of a wavelength of 248 nm and ArF excimer laser apparatus for emitting vacuum ultraviolet rays of a wavelength of 193 nm are being used as gas laser apparatus for exposure. Attempts are being made to apply a liquid immersion technique of reducing the apparent wavelength of an exposure light source by filling the gap between an exposure lens and a wafer, thereby shifting the refractive index, to an ArF excimer laser apparatus as an exposure technique of the next generation. With ArF excimer laser liquid immersion, the wavelength is reduced to 134 nm when immersed in pure water. $F_2$ laser liquid immersion exposure may possibly be adopted for $F_2$ (molecular fluorine) laser apparatus that emit vacuum ultraviolet rays of a wavelength of 157 nm as exposure light sources of the third generation. The wavelength is believed to be made equal to 115 nm by $F_2$ laser liquid immersion exposure.
(Exposure Optical Element and Chromatic Aberration)

Many semiconductor exposure apparatus adopt a projection optical system as the optical system thereof. In a projection optical system, optical elements such as lenses having different refractive indexes are combined to correct the chromatic aberration. At present, optical materials that are suitable as lens materials of projection optical systems for the wavelength (ultraviolet) range between 248 nm and 157 nm of lasers operating as exposure light sources are only synthetic quartz and $CaF_2$. For this reason, monochromatic lenses of the total refraction type that are formed only by synthetic quartz are adopted as projection lenses for KrF excimer lasers, whereas partially achromatic lenses of the total refraction type that are formed by synthetic quartz and $CaF_2$ are adopted as projection lenses for ArF excimer lasers. However, the natural oscillation spectrum line width of both KrF excimer lasers and ArF excimer lasers is as wide as about 350 pm to 400 pm so that, when such a projection lens is used, chromatic aberration occurs to reduce the resolving power. Therefore, the spectrum line width of the laser beams emitted from such gas laser apparatus needs to be narrowed to such a degree at which the chromatic aberration can be disregarded. For this reason, a band narrowing module having a band narrowing element (etalon, grating or the like) is arranged in the laser oscillators of such gas laser apparatus to realize band narrowing of the spectrum line width.
(Liquid Immersion Lithography and Polarized Light Illumination)

As described above, in the case of ArF excimer laser liquid immersion lithography, the refractive index will be 1.44 when $H_2O$ is employed as a medium so that the lens numerical aperture NA that is proportional to the refractive index can be theoretically increased to 1.44 times of the conventional numerical aperture. As the NA is increased, the influence of the degree of polarization of the laser beam that is the light source will increase. While there is no influence in the case of TE polarized light whose direction of polarization is parallel to the direction of the mask pattern, the image contrast will become low in the case of TM polarized light whose direction of polarization is orthogonal to the direction of the mask pattern. This is because the direction of the electric field vector at the focal point on the wafer is different in the latter case so that the intensity becomes weak as the incident angle to the wafer increases if compared with the former case where the direction of the electric field vector is same and identical. The influence thereof is intensified when the NA approaches or exceeds 1.0 and ArF excimer laser liquid immersion falls into such a case. Therefore, a desired state of polarization needs to be controlled for the illumination system of an exposure apparatus as described above. To control such polarized light illumination, the polarization of the laser beam input to the illumination system of the exposure apparatus is required to be in a linearly polarized state. The degree of polarization is the ratio of the linear polarization and the non-linear polarization that are measured and the polarization of a laser beam is required to maintain a high degree of polarization. As illustrated in FIG. 20, when a polarizer is driven to rotate and the maximum value I max and the minimum value 1 min of the intensity of transmitted light are measured, the degree of polarization is expressed by the formula depicted below.

$$P=(I\text{max}-I\text{min})/(I\text{max}+I\text{min}) \quad (1)$$

(Prior Art for Raising Polarization Purity)

The techniques described in Patent Document 1 and Patent Document 2 are known as techniques for raising the degree of polarization of a laser beam.

The technique described in Patent Document 1 provides a method of preventing degree of polarization from being degraded by intrinsic birefringence that arises when light passes the inside of an optical element by making the optical axis of a laser beam to be transmitted perpendicularly relative to the (100) crystal face of the calcium fluoride crystal of the optical element used for a laser.

However, the above-described prior art has the following problem.

The degree of polarization of a laser beam is degraded by birefringence of the optical element in the laser apparatus when the laser beam passes through the optical element. Birefringence includes stress birefringence caused by external mechanical stress and/or thermal stress and intrinsic birefringence that intrinsically exists and is expressed by the crystal structure thereof if such stresses do not exist.

The technique described in Patent Document 1 is to prevent degradation of degree of polarization due to intrinsic birefringence by arranging a laser beam to pass perpendicularly relative to the (100) crystal face of an optical element. Stress birefringence that arises when stress is applied is largest in the direction that is perpendicular relative to the (100) crystal face and, when it is used as a chamber window, stress birefringence can possibly take place due to the stress that arises when holding the window, the gas pressure of several atmospheric pressures in the chamber and/or the stress caused by the thermal stress that arises by laser beam irradiation.

Additionally, a cut surface is produced at an angle of 17.58° or 26.76° relative to the (111) crystal face and cut surfaces are used as the opposite surfaces of the chamber window so that the following two problems arise. One is that, since the surface coarseness of the cut surfaces does not allow small high precision polishing to reduce the threshold value for the surface damage caused by laser irradiation. The other is that, when used as a chamber window, it is subjected to gas pressure of about 4,000 hPa so that it can be broken at the (111) crystal face that is apt to be cleaved. Furthermore, when the cut surface is produced at 17.58° relative to the (111) crystal face, the angle formed by the chamber window and the optical axis is 70° and hence Fresnel reflection of P-polarized light and that of S-polarized light are 4.2% and 30.0% respectively so that, although the P-polarized light component is selected, the Fresnel reflection of P-polarized light is large as a result of being transmitted through the window to make it impossible to secure the laser output.

Thus, Patent Document 2 represents a technique of preventing degradation of degree of polarization due to intrinsic birefringence and stress birefringence from taking place by means of an optical element for an ultraviolet gas laser such as a window made of calcium fluoride crystal and having two faces, one of which, or face 2, is adapted to receive ultraviolet rays entering through it and exiting from the other face and at least one of which is parallel to the (110) crystal face of the calcium fluoride crystal and also preventing cracks and defects from arising by laser irradiation by smoothing the cut surfaces.

A technique of arranging a ½ wave plate and a polarizer on the optical axis and driving it to rotate in order to control the polarization azimuth thereof and raise the degree of polarization has also been disclosed (Patent Document 3).

[Patent Document 1]
U.S. Patent Application Publication No. 2003/219056: Specification
[Patent Document 2]
JP-A-2006-73921
[Patent Document 3]
JP-A-2006-179600

However, the technique represented in Patent Document 2 can give rise to cleavage in operation by the chamber gas pressure that is applied perpendicularly to the window and the mechanical stress for holding the window because it prevents degradation of degree of polarization due to intrinsic birefringence and stress birefringence and selects the (110) crystal face for a cut surface of the calcium fluoride crystal. Additionally, slippage can take place along the (111) crystal face in the crystal and the window can be broken as a result.

The technique of Patent Document 3 raises the degree of polarization by passing a polarizer that allows only p-polarized light to pass through it so that the s-polarized component is removed by reflection and by shifting the optical axis.

Therefore, the intensity of light of the s-polarized component is lost. In short, a loss arises. The gas stress in the chamber needs to be raised and/or the discharge voltage needs to be increased in order to compensate the loss. When the gas stress in the chamber is raised, the load to be borne by the chamber window due to an increase of gas stress and a fall of degree of polarization increases to shorten the service life of the apparatus. Additionally, when the discharge voltage is increased, the load applied to the ps separation membrane and the lotion prism arranged on the optical axis representing a high light energy density is increased to damage them within a short period of time. Furthermore, it is not possible to control the degree of polarization.

In view of the above-identified problems of the prior art, it is therefore an object of the present invention to provide a degree of polarization control device formed by using calcium fluoride crystal to reduce the damaging phenomenon caused by mechanical stress and gas stress, control the degree of polarization and, at the same time, suppress the degradation due to irradiation of a strong ultraviolet laser beam (ArF in particular) and also a gas laser apparatus provided with such a degree of polarization control device.

SUMMARY OF THE INVENTION

In an aspect of the present invention, the above object is achieved by providing a degree of polarization control device including: a calcium fluoride crystal substrate for transmitting a laser beam; a polarization monitor for measuring the degree of polarization of a laser beam transmitted through the calcium fluoride crystal substrate; and a controller for controlling the rotation angle of the calcium fluoride crystal substrate according to the degree of polarization measured by the polarization monitor, in which the calcium fluoride crystal substrate being formed by a flat plate having a laser beam entering surface and a laser beam exiting surface running in parallel with the (111) crystal face, the Brewster angle being selected for the incident angle, the rotation angle around the [111] axis operating as a central axis being controlled by the controller.

Preferably, a degree of polarization control device as defined above includes a plurality of calcium fluoride crystal substrates.

Preferably, a degree of polarization control device as defined above includes a monitor module for observing the condition of the laser beam, the calcium fluoride crystal substrate being adapted to split the laser beam in order to make it enter the monitor module.

In another aspect of the present invention, there is provided a gas laser apparatus provided with a degree of polarization control device as defined above, the apparatus including: a chamber; a laser gas contained in the chamber in a sealed condition; a means for exciting the laser gas; a window arranged at the chamber to allow the laser beam generated from the excited laser gas to exit to the outside of the chamber; and a degree of polarization control device for controlling the degree of polarization of the laser beam exiting from the window.

Thus, the present invention can reduce the damaging phenomenon caused by mechanical stress and gas stress, control the degree of polarization and, at the same time, suppress the degradation due to irradiation of a strong ultraviolet laser beam (ArF in particular).

Still other objects and advantages of the invention will in part be obvious and will in part be apparent from the specification.

The invention accordingly comprises the feature of construction, combinations of elements and arrangement of parts which will be exemplified in the construction hereinafter set forth and the scope of the invention will be indicated in the claims.

DESCRIPTION OF EXEMPLARY EMBODIMENTS

Now, vacuum ultraviolet laser apparatus according to embodiments of the present invention will be described below.

Figure 1:
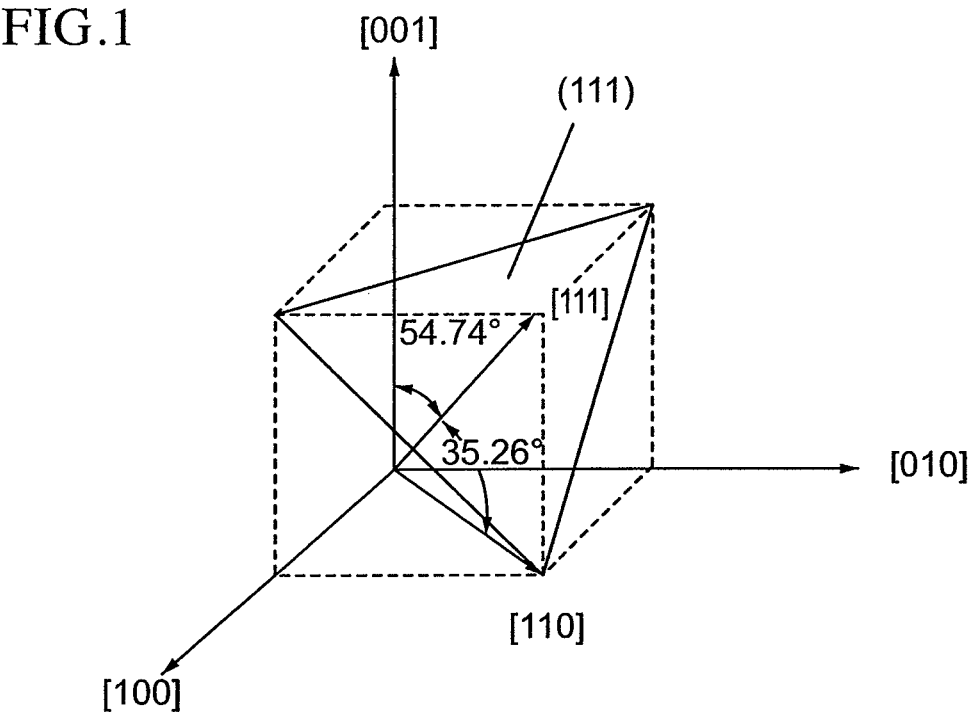
FIG. 1 is a schematic illustration of the crystal lattice of $CaF_2$.

FIG. 1 is a schematic illustration of the crystal lattice of CaF$_2$. In this embodiment, a CaF$_2$ crystal is cut along the (111) crystal face in accordance with the crystal orientation. CaF$_2$ crystal is formed as a face-centered cubic structure as illustrated in FIG. 1.

Figure 2:
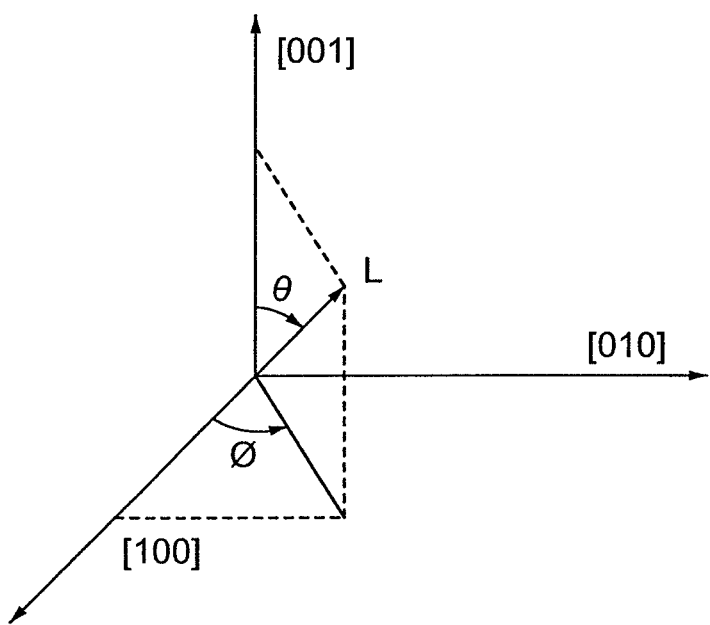
FIG. 2 is a schematic illustration of the definition of angles θ and φ of the light proceeding direction relative to the axis [001] and [100] of CaF$_2$ crystal.

As the angles θ and φ of the light proceeding direction L relative to the axis [001] and [100] of CaF$_2$ crystal are defined in a manner as illustrated in FIG. 2, the direction of the [111] axis is by turn defined by φ=45° and θ=54.74° in FIG. 2. Since the surface of the (111) crystal face is harder than the surfaces of the other crystal axes and hence the hardest, the surface coarseness thereof is low and it can be polished with few latent flaws.

Now, the state in which an optical axis L passes through CaF$_2$ crystal 3 will be described below.

Figure 3:
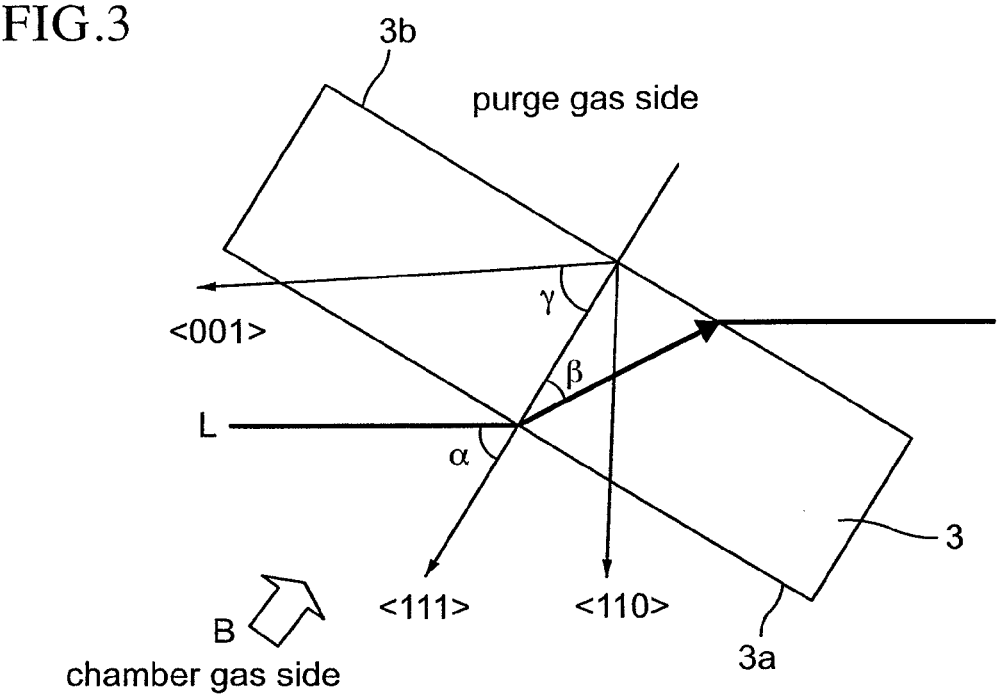
FIG. 3 is a schematic cross-sectional view of a CaF$_2$ crystal substrate.
Figure 4:
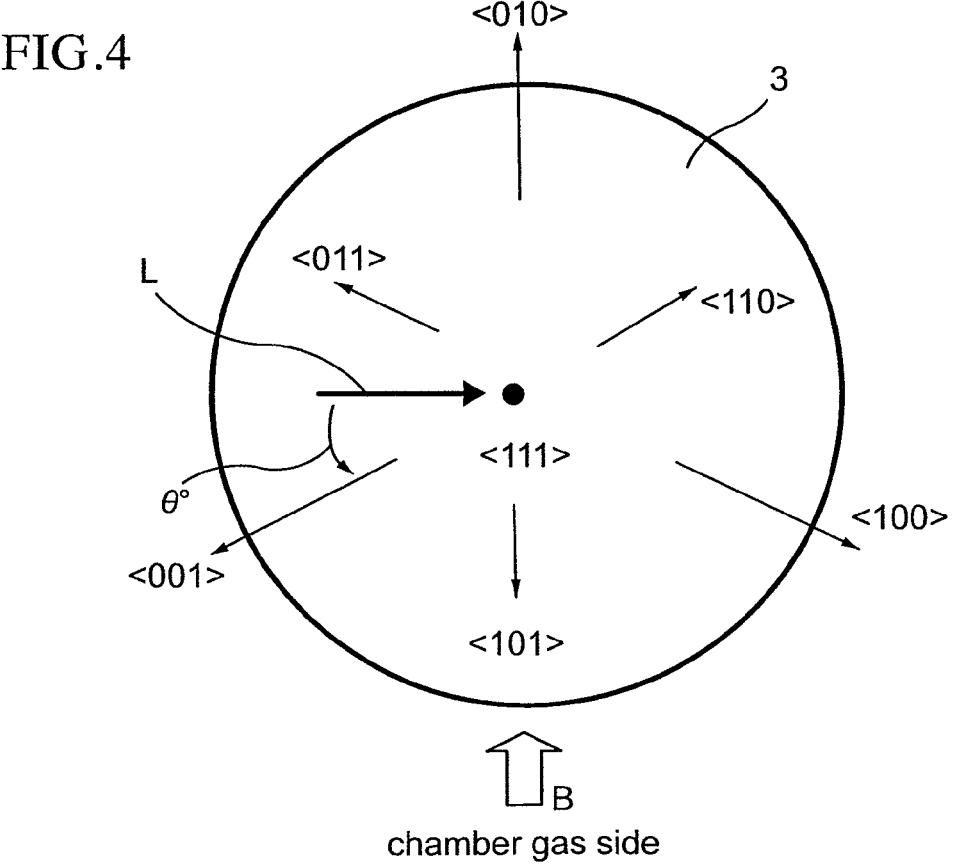
FIG. 4 is a schematic top view of a CaF$_2$ crystal substrate.

FIG. 3 is a schematic cross-sectional view of the CaF$_2$ (calcium fluoride) crystal 3 formed by using CaF$_2$ of this embodiment before being rotated and FIG. 4 is a schematic top view of the CaF$_2$ crystal 3 after being rotated.

FIG. 3 is a cross-sectional view taken along the face that includes the [001] axis, the [110] axis and the [111] axis. The CaF$_2$ crystal 3 of CaF$_2$ is polished at the first surface 3a and the second surface 3b that are parallel to the (111) crystal face. For example, a laser beam enters the CaF$_2$ crystal 3 at the center thereof with entering angle α=55.7° relative to the CaF$_2$ crystal 3 in the face that includes the [001] axis, the [110] axis and the [111] axis. Then, light is refracted with angle of refraction β=33.4° at the first surface 3a according to the Snell's law. At this time, the CaF$_2$ crystal 3 is so arranged that the optical axis of refraction L in the inside of the CaF$_2$ is transmitted in the face that includes the [001] axis, the [110] axis and the [111] axis and between the angle formed by the [111] axis and the [001] axis (0°≤γ≤54.7°). Then, the laser beam is transmitted through the CaF$_2$ crystal 3 and exits the CaF$_2$ crystal with exiting angle α=55.7° in the face that includes the [001] axis, the [110] axis and the [111] axis at the second surface 3b according to the Snell's law just like at the first surface 3a.

In this embodiment, the CaF$_2$ crystal 3 is arranged at a position rotated from this state by angle θ relative to the [111] axis that operates as a central axis.

FIG. 4 is a schematic top view of a CaF$_2$ crystal 3 as viewed from right above the [111] axis. The face orientation axes of the CaF$_2$ crystal 3 are depicted radially. The CaF$_2$ crystal 3 is formed as a face-centered cubic structure as illustrated in FIG. 1. Thus, the axes of crystal orientation is threefold symmetrical when the axis is the axis of symmetry. Therefore, if the CaF$_2$ crystal 3 is viewed from right above and the [001] axis is selected as a reference axis, while the angle as viewed clockwise is negative and the angle as viewed counterclockwise is positive, then the angle formed by the [001] axis and the [011] axis is −60° and the angle formed by the [001] axis and the [010] axis is −120°, whereas the angle formed by the [001] axis and the [110] axis is 180° and the angle formed by the [001] axis and the [101] axis and the angle formed by the [001] axis and the [100] axis are 60° and 120° respectively.

As illustrated in FIG. 4, the CaF$_2$ crystal 3 is arranged at a position rotated by angle θ° around the [111] axis, which operates as a central axis, relative to the arrangement by which the laser beam entering the crystal passes through the face that includes the [111] axis and the [001] axis.

Now, how the state of polarization changes due to birefringence will be described below. Generally, light propagating through crystal is a linear combination of two waves in a linearly polarized state that are orthogonal relative to each other and the state of polarization and the direction of polarization of each of them are determined as a function of the phase velocity and the amplitude thereof. When birefringence is produced in crystal by thermal stress, mechanical stress and/or some other stress, the phase velocity of a light beam propagating through crystal is shifted in the direction of polarization. As a result, when light propagating through crystal is split in the two directions including the direction of the fast axis and that of the slow axis that are orthogonal relative to each other, the phases of lights propagating in the two directions are varied from each other because of the difference of velocity of light (due to birefringence).

Figure 5:
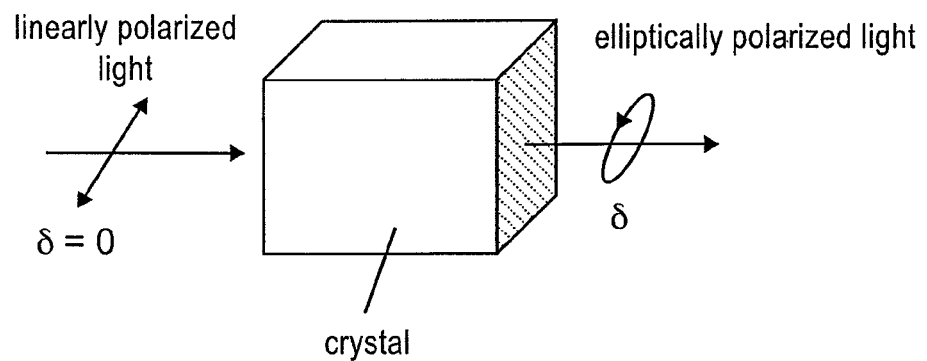
FIG. 5 is a schematic illustration of a state of polarization of crystal.
Figure 6:
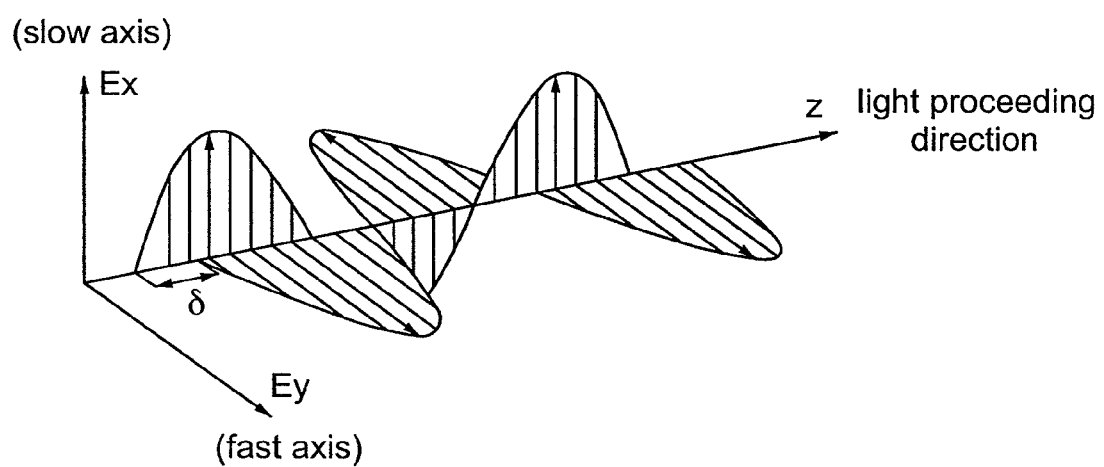
FIG. 6 is a schematic illustration of phase difference.

Because of this phenomenon, when linearly polarized light enters as illustrated in FIG. 5, it is turned into elliptically polarized light (circularly polarized light when the phase difference between the two components is made equal to 90°) and exits in a changed state of polarization. The value of the phase difference due to birefringence varies as a function of the crystal orientation in which light propagates. The phase difference is nil when light propagates in the crystal orientation that operates as optical axis because no birefringence takes place. When only intrinsic birefringence of CaF$_2$ crystal is taken into consideration, the optical axis will be the [111] axis and the [001] axis, the [100] axis, the [010] axis or an axis equivalent to it. If the direction of polarization of entering light is parallel or perpendicular to the fast axis or the slow axis of the crystal as illustrated in FIG. 6, light is not split into two components so that no phase difference arises.

A CaF$_2$ crystal was arranged for measurement with the incident angle of light to be used in Chamber 1 and driven to rotate around the [111] axis that operated as a central axis to change the crystal orientation for propagation of light. Then, the change in the state of polarization was observed. Some of the obtained results will be described below.

Figure 7:
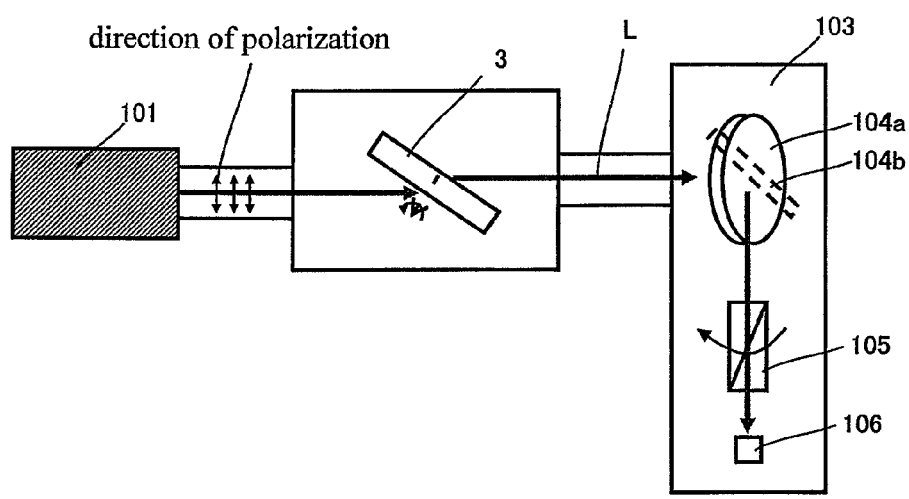
FIG. 7 is a schematic illustration of a state of polarization observation experiment system.
Figure 8:
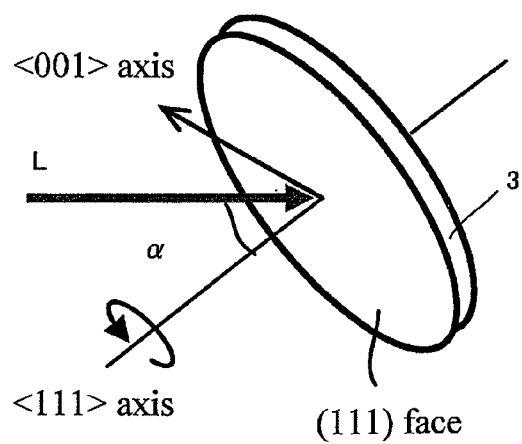
FIG. 8 is a schematic illustration of a measuring element.

FIG. 7 is a schematic illustration of a state of polarization state observation experiment system. A linearly polarized laser beam emitted from a narrow band ArF laser 101 (4 kHz, 10 mJ) was used and the CaF$_2$ crystal 3 was arranged with an incident angle of α=55.7°. The direction of polarization of the entering laser beam was made to be in line with that of the actual device and the laser beam was made to enter in a direction parallel to the sheet of FIG. 7. After passing through the CaF$_2$ crystal 3, the laser beam was made to enter a degree of polarization meter 103 to measure its linear degree of polarization. In the degree of polarization meter 103, two folding windows 104a, 104b are used in order to prevent the degree of polarization of the reflected laser beam from being shifted by folding the light path. The laser beam is made to pass a lotion prism 105 and the output thereof is observed by means of a sensor 106. The lotion prism 105 was driven to rotate while observing the output and the linear degree of polarization was measured by means of the formula (1) described earlier. As illustrated in FIG. 8, the CaF$_2$ crystal was cut along the (111) crystal face and driven to rotate around the [111] axis that operated as a center of rotation at intervals of 10° and the change of the linear degree of polarization was measured over the range of 0° through 360°.

Figure 9:
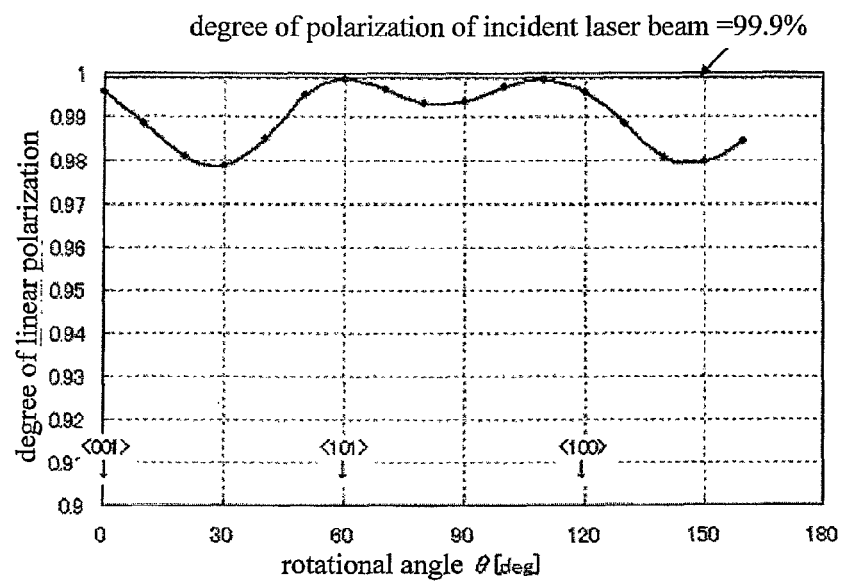
FIG. 9 is a graph illustrating the results of measurement of the linear degree of polarization relative to the rotation angle when the degree of polarization of an incident laser beam is made equal to 99.9%.

FIG. 9 is a graph illustrating the results of measurement of the linear degree of polarization relative to the rotation angle when the degree of polarization of the incident laser beam is made equal to 99.9%. θ=0° refers to that the optical axis L is in the direction of the [001] axis. The positive direction of the rotation angle θ refers to that the CaF$_2$ crystal 3 was driven to rotate counterclockwise.

As illustrated in FIG. 9, it was found that the degree of polarization falls at intervals of 60° or at θ=30°, 90° and 150°. Conversely, it was found that the degree of polarization does not change in the directions of θ=0°, 60° and 120°. As a result, it was found that the phase difference does not change when light propagates in the directions of the [001] axis and the [101] axis, whereas the phase difference changes at angles between them. It was also found that the phase difference changes maximally at angles shifted from the [001] axis by 30°.

Figure 10:
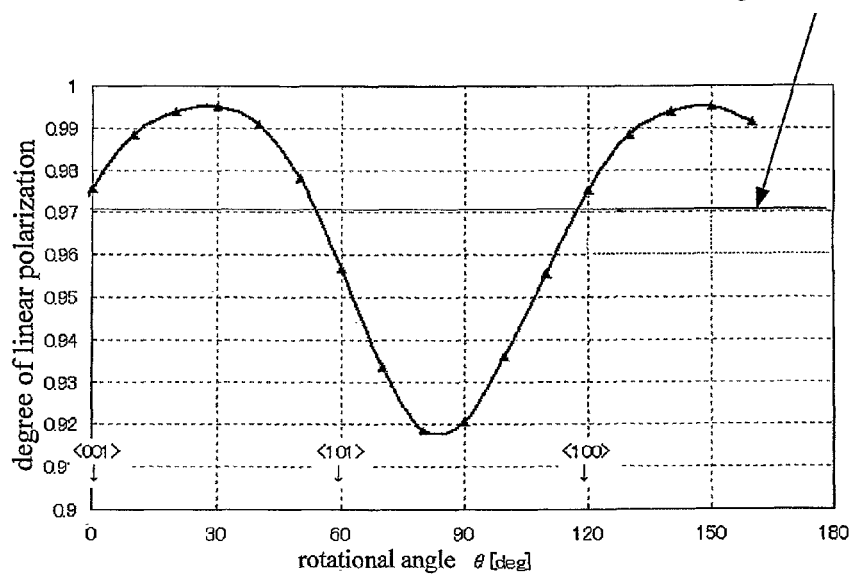
FIG. 10 is a graph illustrating the results of measurement of the linear degree of polarization relative to the rotation angle when the degree of polarization of an incident laser beam is made equal to 97.1%.

FIG. 10 is a graph illustrating the results of measurement of the linear degree of polarization relative to the rotation angle when the degree of polarization of the incident laser beam is made equal to 97.1%. From the illustrated results, similarly, the degree of polarization of the laser beam does not change at or near θ=0°, 60° and 120° but changes maximally at or near θ=30°, 90° and 150° after the transmission of the laser.

Differently stated, when light propagates in the directions of the [001] axis and the [101] axis, the phase difference thereof does not change, although the phase difference changes at angles between them. Particularly, the phase difference changes maximally when the angle shift is 30° or 90° from the direction of the [001] axis. The degree of polarization is improved by a phase shift because the shift takes place in the direction of reducing the difference of the phase that has been shifted originally as a result of passing through the crystal.

Figure 11:
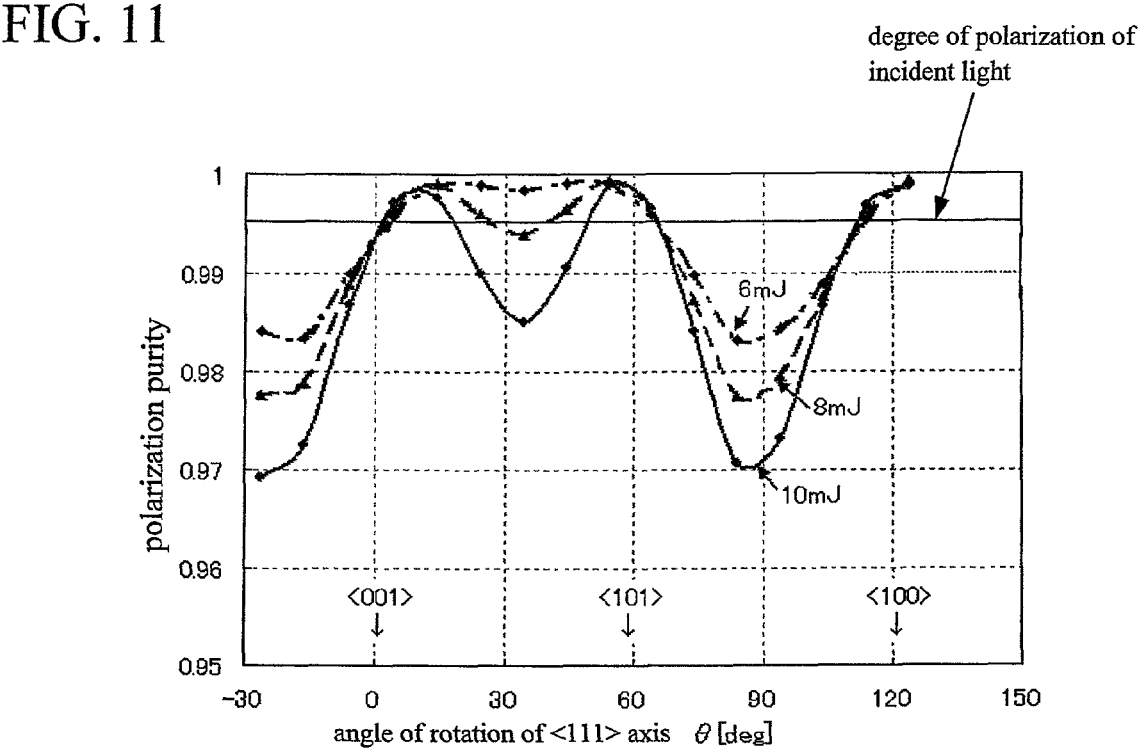
FIG. 11 is a graph illustrating the results of measurement of the linear degree of polarization relative to the rotation angle when the pulse energy of incident light is varied.

FIG. 11 is a graph illustrating the results of measurement of the linear degree of polarization relative to the rotation angle when the pulse energy of incident light is varied. It was also found that, when the pulse energy of incident laser beam is varied, the characteristic amplitude (the extent of phase difference) also varies. In other words, the extent of stress birefringence due to thermal stress varies.

For this reason, it was found that this characteristic is relative to stress birefringence and the directions of the [001] axis and the [101] axis are those of fast axes or slow axes (or optical axes) and hence, while the phase difference does not change when light is propagated in these directions, the phase difference is maximized at the middle thereof, or at 30°.

Figure 12:
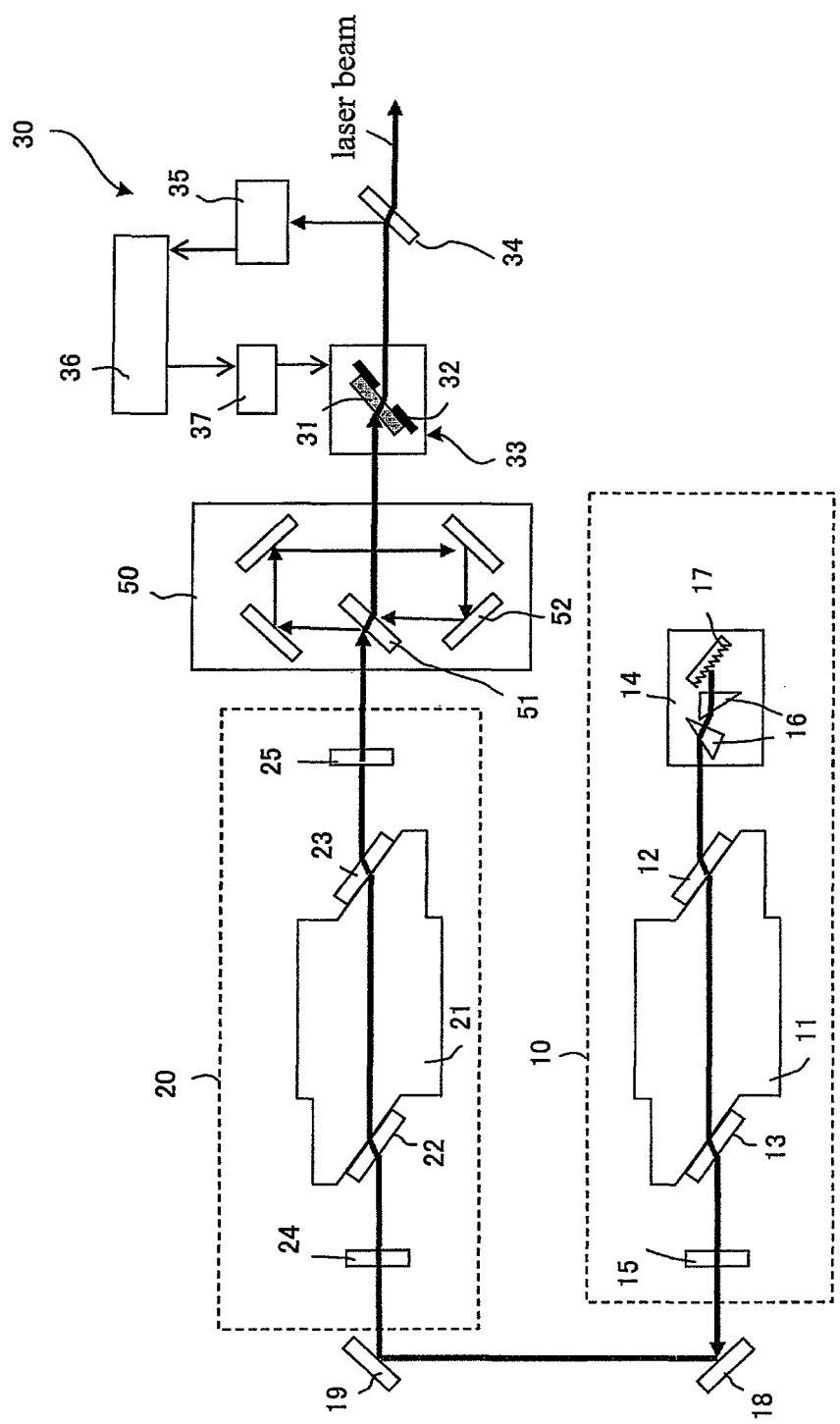
FIG. 12 is a schematic illustration of the system according to a first embodiment.

FIG. 12 is a schematic illustration of the configuration of the optical system of 2-stage laser system 1 and an example of arrangement of the first embodiment of degree of polarization control device according to the present invention in the laser system.

The 2-stage laser system 1 includes an oscillator laser 10 and an amplifier laser 20 for receiving the laser beam (seed beam) oscillated by the oscillator laser 10 and amplifies it. An ArF excimer laser apparatus or an F$_2$ laser apparatus particularly for exposures that require a high output level not less than 40 W in a narrow band is adopted.

The oscillator laser 10 includes a chamber 11 for containing laser gas in a sealed condition, a band narrowing module 14 for forming an oscillator and a partial reflection mirror 15 that operates as an output mirror. It additionally includes a laser gas exciting system and a control system, which are not represented, as well as a cooling system and a gas exchange system.

Two windows 12 and 13 are arranged on the optical axis L in the chamber 11. The band narrowing module 14 includes a single beam expanding prism or a plurality of beam expanding prisms 16 (two in FIG. 12) for forming a beam expanding optical system and a grating 17 (or an etalon) that operates as a band narrowing element.

The amplifier laser 20 also includes a chamber 21 for containing laser gas in a sealed condition and partial reflection mirrors 24, 25 for forming an oscillator. It additionally includes a laser gas exciting system and a control system, which are not illustrated, as well as a cooling system and a gas exchange system.

Two windows 22 and 23 are arranged on the optical axis L in the chamber 21. Referring to FIG. 12, the laser beam oscillated by the oscillator laser 10 is reflected by the mirrors 18 and 19 to enter the amplifier laser 20.

The laser beam that exits from the partial reflection mirror 25 then passes an optical pulse stretcher 50 and enters a degree of polarization control device 30.

The degree of polarization control device (or, polarization purity control device) 30 includes a CaF$_2$ crystal substrate 31, a rotary stage 32 to which the CaF$_2$ crystal substrate 31 is fitted, the rotary stage 32 and the CaF$_2$ crystal substrate 31 forming a control module 33, a beam splitter 34 for taking out part of the laser beam at a position downstream relative to the CaF$_2$ crystal substrate 31, a polarization monitor 35 for receiving the laser beam taken out from the beam splitter 34 and measuring the degree of polarization of the laser beam, a controller 36 for computationally determining if control is required or not from the output signal on the degree of polarization measured by the polarization monitor 35 and, if necessary, determining the extent of rotation of the CaF$_2$ crystal substrate 31 and rotary driver 37 for driving the rotary stage 32 in response to the extent of rotation as computationally determined by the controller 36.

The CaF$_2$ crystal substrate 31 is formed by a parallel plate whose surface is polished at the (111) crystal face so as to make the incident angle be Brewster angle and that can rotate at the [111] axis, the parallel plate being arranged on the laser optical axis extending from the PO laser 20.

Figure 13:
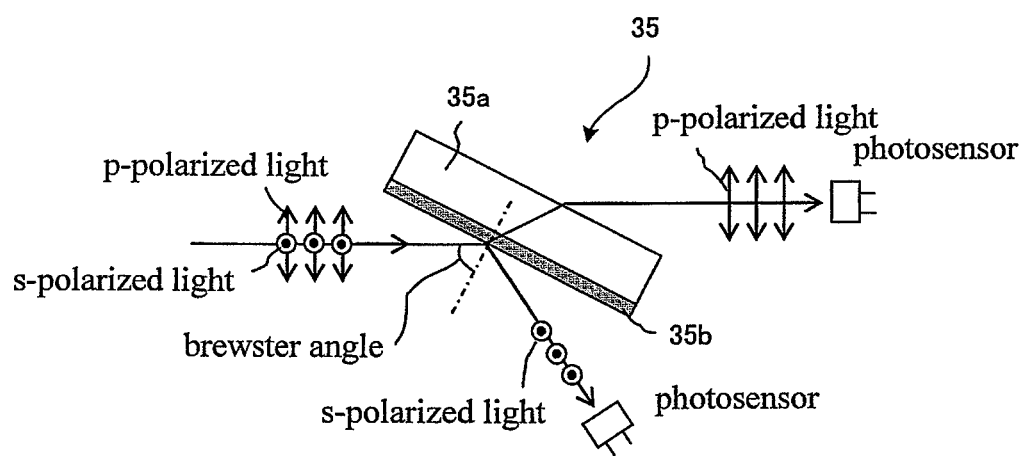
FIG. 13 is a schematic illustration of the polarization monitor of the system according to the first embodiment.

One of the techniques disclosed in JP-A-2007-214189 is preferably applied to the polarization monitor 35. For example, as illustrated in FIG. 13, a substrate prepared by arranging a ps separation membrane 35b on a polarization monitoring CaF$_2$ crystal substrate 35a is employed to measure the p-polarized component and the s-polarized component of the laser beam. As the degree of polarization is degraded, the s-polarized component increases so that the degree of polarization can be measured by determining the ratio of the s-polarized component.

Figure 14:
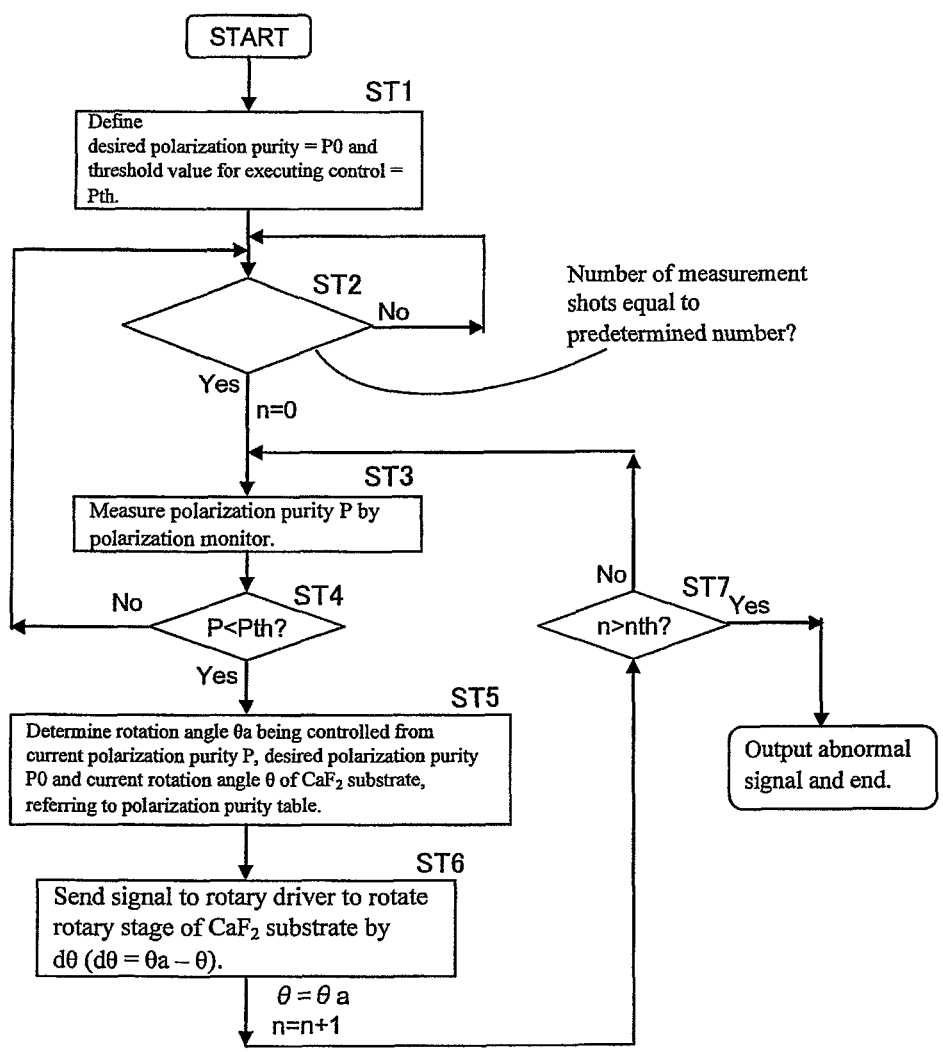
FIG. 14 is a flowchart illustrating Example 1 according to the first embodiment.

Now, a control flowchart, or control flowchart Example 1 of the degree of polarization control device 30 of the first embodiment will be described below. FIG. 14 is a control flowchart illustrating the degree of polarization control device 30 of Example 1.

Firstly, in Step 1, the desired degree of polarization PO and the threshold value Pth for the degree of polarization on which a control operation is to be executed are defined as parameters (ST 1). Then, in Step 2, it is determined if the number of measurement shots is equal to the predetermined number or not for checking the degree of polarization while the laser is in operation (ST 2).

If it is determined in Step 2 that the number of measurement shots is not equal to the predetermined number, the control operation returns to Step 2. If, on the other hand, it is determined in Step 2 that the number of measurement shots is equal to the predetermined number, the degree of polarization P is measured by the polarization monitor 35 in Step 3 (ST 3).

Then, in the next step, or Step 4, it is determined if the degree of polarization P measured in Step 3 is smaller than the threshold value Pth defined in Step 1 or not (ST 4).

If it is determined in Step 4 that the degree of polarization P is not smaller than the threshold value Pth, the control operation returns to Step 2. If, on the other hand, it is determined in Step 4 that the degree of polarization P is smaller than the threshold value Pth, the current degree of polarization P, the desired degree of polarization PO and the rotation angle θa of the control module 33 are determined in Step 5, the rotation angle θa of the control module 33 being determined from the predetermined degree of polarization table on the basis of the current rotational position θ of the CaF$_2$ crystal substrate 31 (ST 5). Note, however, that a degree of polarization table depicts the relationship between the rotational angle and the degree of polarization of the incident laser beam after being transmitted through the crystal as seen from FIGS. 9 and 10. Thus, the rotational angle θa for achieving the desired degree of polarization PO is determined from the table. Also note that the degree of polarization table varies from element to element.

In the next step, or Step 6, a signal is transmitted to the rotary driver 37 to drive the rotary stage 32 of the CaF$_2$ crystal substrate 31 to rotate by dθ (dθ=θa−θ) from the current position (ST 6). At this time, θ and n are turned respectively to θ=θa and n=n+1.

In the next step, or Step 7, it is determined if the number of times n of repeating the control routine exceeds the predefined number of times nth and hence n>nth or not (ST 7). If it is determined in Step 7 that the number of times n of repeating the control routine does not exceed the predefined number of times nth and hence not n>nth, the control operation returns to Step 3. If, on the other hand, it is determined in Step 7 that the number of times n of repeating the control routine exceeds the predefined number of times nth and hence n>nth, abnormal degree of polarization is determined and an abnormal signal is output to end the control operation.

Figure 15:
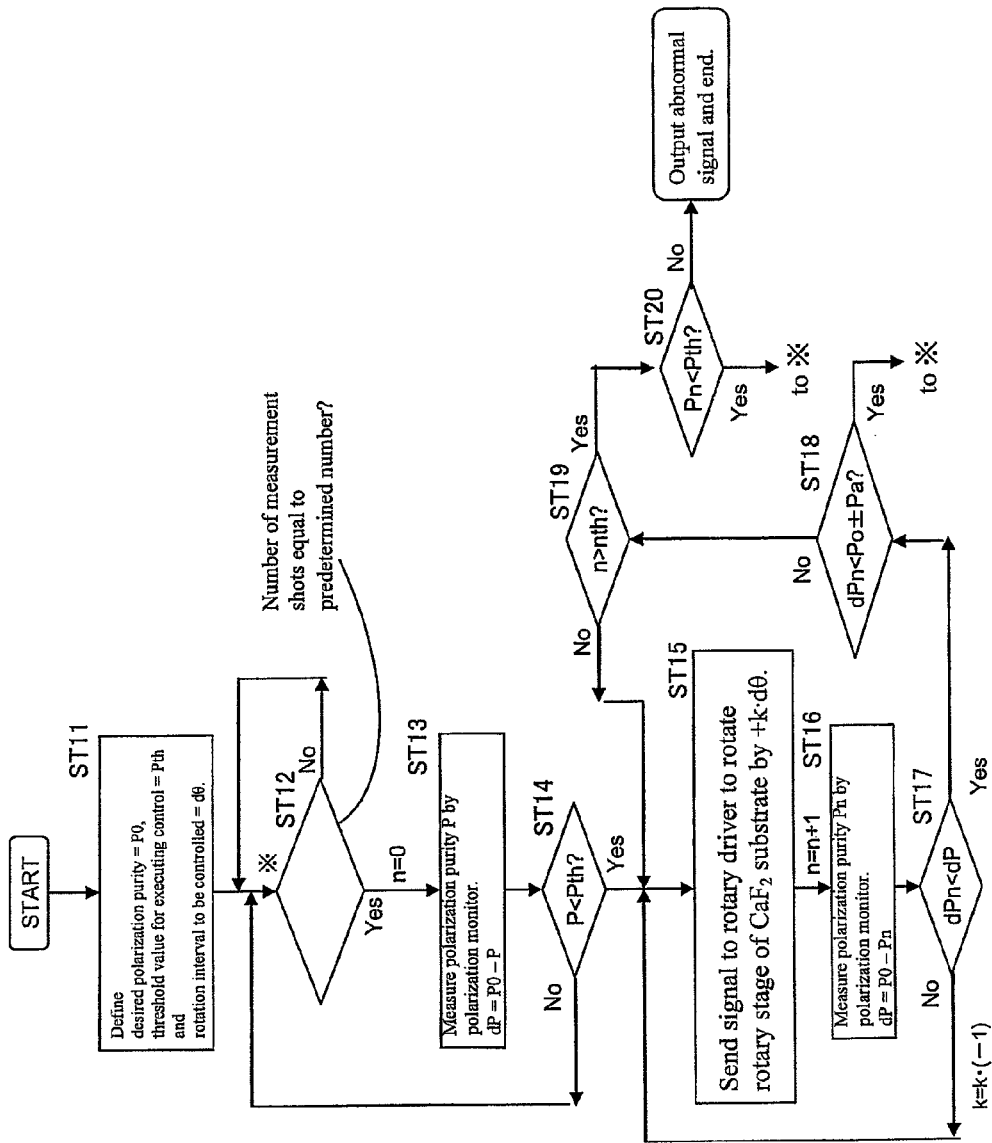
FIG. 15 is a flowchart illustrating Example 2 according to the first embodiment.

Now, a control flowchart, or control flowchart Example 2 of the degree of polarization control device 30 of the first embodiment will be described below. FIG. 15 is a control flowchart illustrating the degree of polarization control device 30 of Example 2.

Firstly, in Step 11, the desired degree of polarization PO and the threshold value Pth for the degree of polarization on which a control operation is to be executed are defined as parameters (ST 11). Then, in Step 12, it is determined if the number of measurement shots is equal to the predetermined number or not for checking the degree of polarization while the laser is in operation (ST 12).

If it is determined in Step 12 that the number of measurement shots is not equal to the predetermined number, the control operation returns to Step 12. If, on the other hand, it is determined in Step 12 that the number of measurement shots is equal to the predetermined number, the degree of polarization P is measured by the polarization monitor 35 in Step 13 (ST 13). Note that dP=P0−P.

Then, in the next step, or Step 14, it is determined if the degree of polarization P measured in Step 13 is smaller than the threshold value Pth defined in Step 11, or P<Pth, or not (ST 14).

If it is determined in Step 14 that the degree of polarization P is not smaller than the threshold value Pth, the control operation returns to Step 12. If, on the other hand, it is determined in Step 14 that the degree of polarization P is smaller than the threshold value Pth, a signal is transmitted to the rotary driver 37 in Step 15 to drive the rotary stage 32 of the CaF$_2$ crystal substrate 31 to rotate by +kdθ obtained by multiplying predetermined micro rotational angle dθ by coefficient k (ST 15). At this time, n is turned to n=n+1.

Then, in the next step, or Step 16, the degree of polarization Pn is measured again by the degree of polarization monitor 35 after the rotation (ST 16). At this time, dPn is turned to dPn=P0−Pn.

Then, in the next step, or Step 17, it is determined if dPn<dP holds true or not according to the measured degree of polarization (ST 17). If it is determined in Step 17 that dPn<dP does not hold true, the measured degree of polarization is moving away from the desired degree of polarization P0 because the rotational direction is opposite so that k is turned to k=k·(−1) and the control operation returns to Step 15.

If, on the other hand, it is determined in Step 17 that dPn<dP holds true, it is then determined in Step 18 if the degree of polarization has got into a range that takes the tolerance value Pa into consideration or not, or if dPn<P0±Pa holds true or not (ST 18). If it is determined in Step 18 that dPn<P0±Pa holds true, the control operation returns to Step 12.

If, on the other hand, it is determined in Step 18 that dPn<P0±Pa does not hold true, it is determined in Step 19 if the number of times n of repeating the control routine exceeds the predefined number of times nth and hence n>nth or not (ST 19).

If it is determined in Step 19 that the number of times n of repeating the control routine does not exceed the predefined number of times nth and hence not n>nth, the control operation returns to Step 15. If, on the other hand, it is determined in Step 19 that the number of times n of repeating the control routine exceeds the predefined number of times nth and hence n>nth, it is then determined in Step 20 if the degree of polarization Pn is smaller than the threshold value Pth, or Pn<Pth, or not (ST 20). If it is determined in Step 20 that Pn<Pth holds true, the control operation returns to Step 12. If, on the other hand, it is determined in Step 20 that Pn<Pth does not hold true, an abnormal signal is output to end the control operation.

Figure 16:
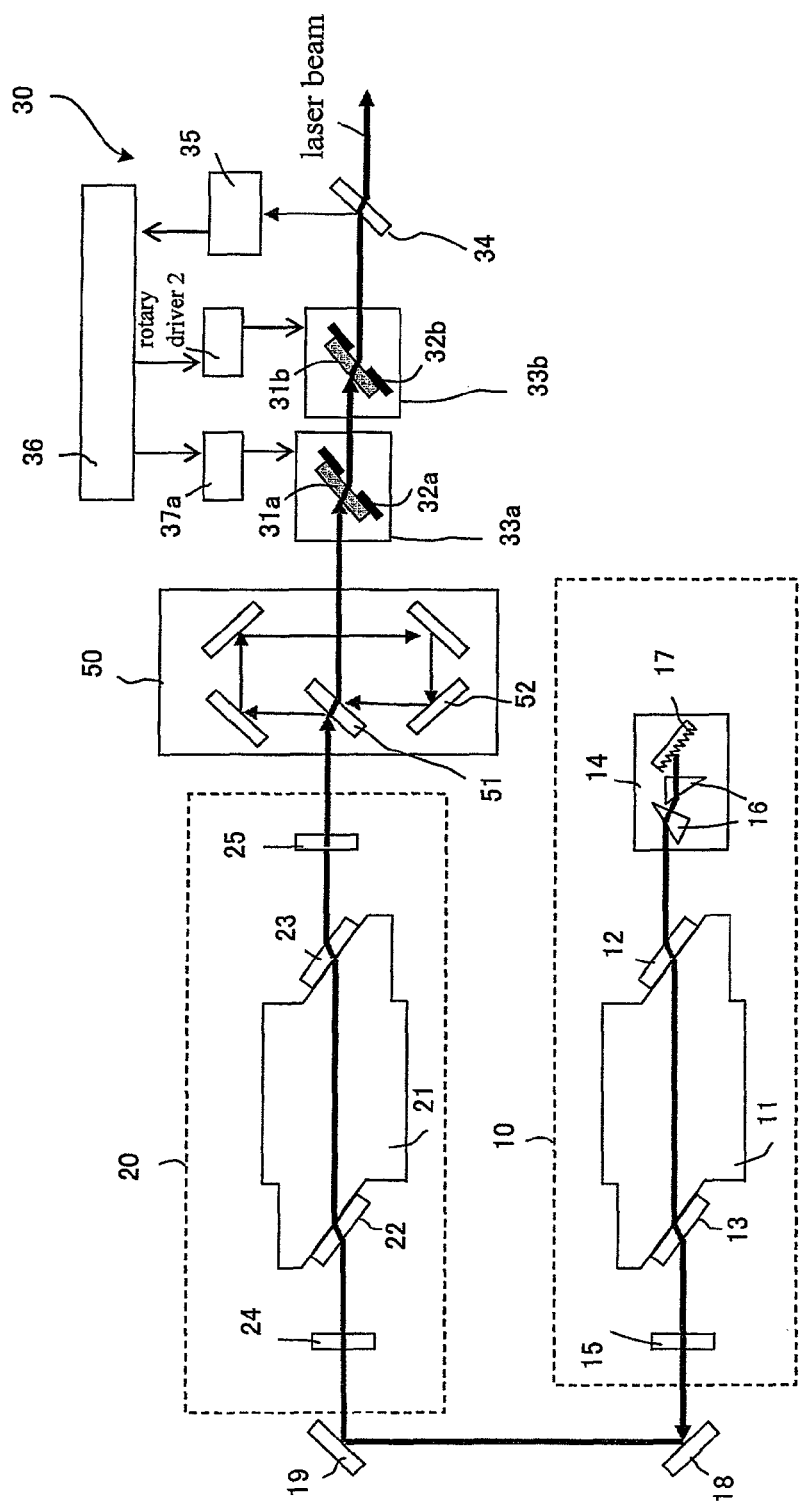
FIG. 16 is a schematic illustration of the system according to a second embodiment.

Now, the second embodiment will be described below. The degree of polarization control device 30 of the second embodiment has a plurality of $CaF_2$ crystal substrates 31. For example, as illustrated in FIG. 16, the degree of polarization control device 30 has a first $CaF_2$ crystal substrate 31a, a first rotary stage 32a, the first $CaF_2$ crystal substrate 31a and the first rotary stage 32a forming a first control module 33a, and a first rotary driver 37a as well as a second $CaF_2$ crystal substrate 31b, a second rotary stage 32b, the second $CaF_2$ crystal substrate 31b and the second rotary stage 32b forming a second control module 33b, and a second rotary driver 37b. Otherwise, the second embodiment has a configuration similar to the first embodiment and hence will not be described any further.

When the degree of polarization control device 30 of the second embodiment cannot improve the degree of polarization to a desired level by controlling the first control module 33a that includes the first $CaF_2$ crystal substrate 31a, it starts controlling the second control module 37b that includes the second $CaF_2$ crystal substrate 31b to restore the desired level of degree of polarization. Preferably, it initially controls only the first $CaF_2$ crystal substrate 31a and does not control the second $CaF_2$ crystal substrate 31b, holding θ=0. The number of $CaF_2$ crystal substrates is not limited to two and more than two $CaF_2$ crystal substrates may be provided and controlled sequentially. If such is the case, the Brewster angle that makes the reflectance equal to 0 for the p-polarized component is selected for the incident angle in order to prevent any loss from arising on the substrate surface.

Figure 17:
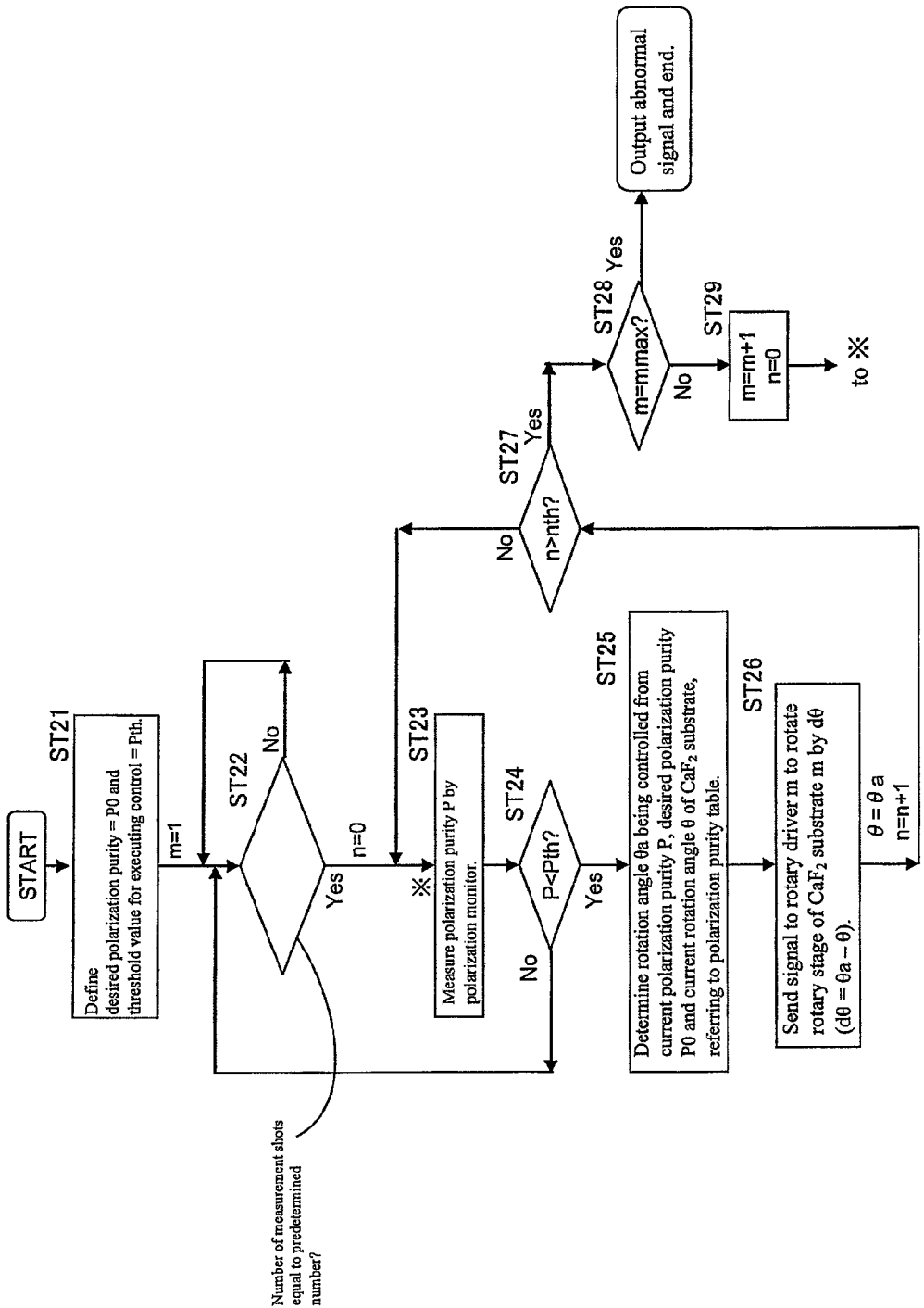
FIG. 17 is a flowchart illustrating Example 1 according to the second embodiment.

Now, a control flowchart, or control flowchart Example 1 of the degree of polarization control device 30 of the second embodiment will be described below. FIG. 17 is a control flowchart, or control flowchart Example 1, of the degree of polarization control device 30.

Firstly, in Step 21, the desired degree of polarization PO and the threshold value Pth for the degree of polarization on which a control operation is to be executed are defined as parameters (ST 21). Then, in Step 22, it is determined if the number of measurement shots is equal to the predetermined number or not for checking the degree of polarization while the laser is in operation (ST 22).

If it is determined in Step 22 that the number of measurement shots is not equal to the predetermined number, the control operation returns to Step 22. If, on the other hand, it is determined in Step 22 that the number of measurement shots is equal to the predetermined number, the degree of polarization P is measured by the polarization monitor 35 in Step 23 (ST 23). Note that dP=P0−P.

Then, in the next step, or Step 24, it is determined if the degree of polarization P measured in Step 23 is smaller than the threshold value Pth and hence P<Pth defined in Step 21 or not (ST 24).

If it is determined in Step 24 that the degree of polarization P is not smaller than the threshold value Pth, the control operation returns to Step 22. If, on the other hand, it is determined in Step 4 that the degree of polarization P is smaller than the threshold value Pth, the current degree of polarization P, the desired degree of polarization PO and the rotation angle θa of the control module 33 are determined in Step 25, the rotation angle θa of the control module 33 being determined from the predetermined degree of polarization table on the basis of the current rotational position θ of the $CaF_2$ crystal substrate 31 (ST 25). Note, however, that a degree of polarization table depicts the relationship between the rotational angle and the degree of polarization of the incident laser beam after being transmitted through the crystal as seen from FIGS. 9 and 10. Thus, the rotational angle θa for achieving the desired degree of polarization P0 is determined from the table. Also note that the degree of polarization table varies from element to element.

In the next step, or Step 26, a signal is transmitted to the rotary driver 37 to drive the rotary stage 32 of the $CaF_2$ crystal substrate 31 to rotate by dθ (dθ=θa−θ) from the current position (ST 26). At this time, θ and n are turned respectively to θ=θa and n=n+1.

In the next step, or Step 27, it is determined if the number of times n of repeating the control routine exceeds the predefined number of times nth and hence n>nth or not (ST 7).

If it is determined in Step 27 that n>nth holds true, then it is determined in Step 28 if the number of control modules is m=mmax and hence all the modules have been controlled or not (ST 28). If it is determined in Step 28 that m=mmax holds true, an abnormal signal is output to end the control operation. If, on the other hand, it is determined in Step 28 that m=mmax does not hold true, m and n are turned respectively to m=m+1 and n=0 and the control operation returns to Step 22.

Figure 18:
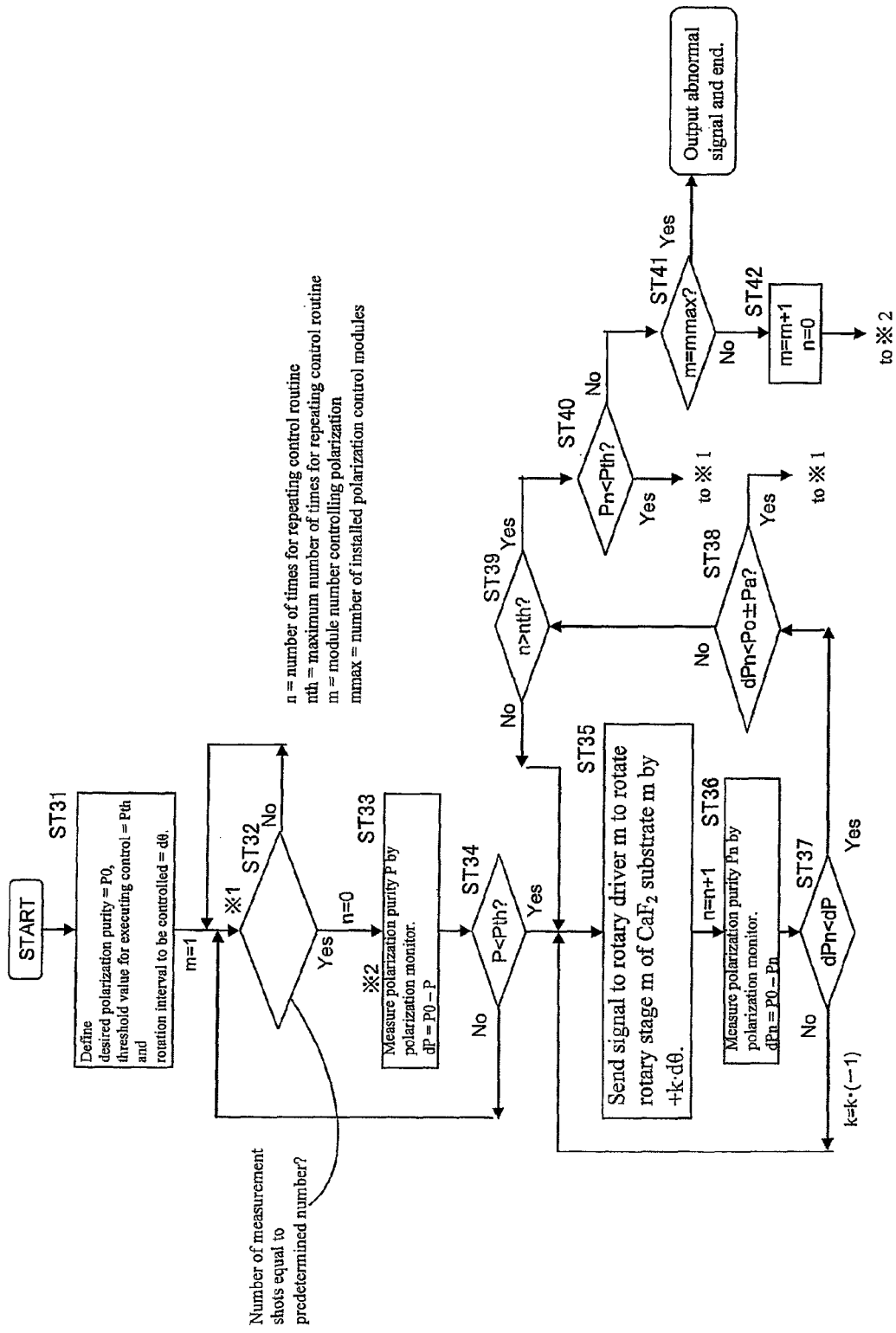
FIG. 18 is a flowchart illustrating Example 2 according to the second embodiment.

Now, a control flowchart, or control flowchart Example 2 of the degree of polarization control device 30 of the second embodiment will be described below. FIG. 18 is a control flowchart, or control flowchart Example 2, of the degree of polarization control device 30.

Firstly, in Step 31, the desired degree of polarization PO and the threshold value Pth for the degree of polarization on which a control operation is to be executed are defined as parameters (ST 31). Then, in Step 32, it is determined if the number of measurement shots is equal to the predetermined number or not for checking the degree of polarization while the laser is in operation (ST 32).

If it is determined in Step 32 that the number of measurement shots is not equal to the predetermined number, the control operation returns to Step 32. If, on the other hand, it is determined in Step 32 that the number of measurement shots is equal to the predetermined number, the degree of polarization P is measured by the polarization monitor 35 in Step 33 (ST 33). Note that dP=P0−P.

Then, in the next step, or Step 34, it is determined if the degree of polarization P measured in Step 33 is smaller than the threshold value Pth defined in Step 31, or P<Pth, or not (ST 34).

If it is determined in Step 34 that the degree of polarization P is not smaller than the threshold value Pth, the control operation returns to Step 32. If, on the other hand, it is determined in Step 34 that the degree of polarization P is smaller than the threshold value Pth, a signal is transmitted to the rotary driver 37 in Step 35 to drive the rotary stage 32 of the $CaF_2$ crystal substrate 31 to rotate by +kdθ obtained by multiplying predetermined micro rotational angle dθ by coefficient k (ST 35). At this time, n is turned to n=n+1.

Then, in the next step, or Step 36, the degree of polarization Pn is measured again by the degree of polarization monitor 35 after the rotation (ST 36). At this time, dPn is turned to dPn=P0−Pn.

Then, in the next step, or Step 37, it is determined if dPn<dP holds true or not according to the measured degree of polarization (ST 37). If it is determined in Step 37 that dPn<dP does not hold true, the measured degree of polarization is moving away from the desired degree of polarization P0 because the rotational direction is opposite so that k is turned to k=k·(−1) and the control operation returns to Step 35.

If, on the other hand, it is determined in Step 37 that dPn<dP holds true, it is then determined in Step 38 if the degree of polarization has got into a range that takes the tolerance value Pa into consideration or not, or if dPn<P0±Pa holds true or not (ST 38). If it is determined in Step 38 that dPn<P0±Pa holds true, the control operation returns to Step 32.

If, on the other hand, it is determined in Step 38 that dPn<P0±Pa does not hold true, it is determined in Step 39 if the number of times n of repeating the control routine exceeds the predefined number of times nth and hence n>nth or not (ST 39).

If it is determined in Step 39 that the number of times n of repeating the control routine does not exceed the predefined number of times nth and hence not n>nth, the control operation returns to Step 35. If, on the other hand, it is determined in Step 39 that the number of times n of repeating the control routine exceeds the predefined number of times nth and hence n>nth, it is then determined in Step 40 if the degree of polarization Pn is smaller than the threshold value Pth, or Pn<Pth, or not (ST 40).

If it is determined in Step 40 that Pn<Pth holds true, the control operation returns to Step 32. If, on the other hand, it is determined in Step 40 that Pn<Pth does not hold true, then it is determined in Step 41 if the number of control modules is m=mmax and hence all the modules have been controlled or not (ST 41).

If it is determined in Step 41 that m=mmax holds true, an abnormal signal is output to end the control operation. If, on the other hand, it is determined in Step 41 that m=mmax does not hold true, m and n are turned respectively to m=m+1 and n=0 and the control operation returns to Step 33.

Figure 19:
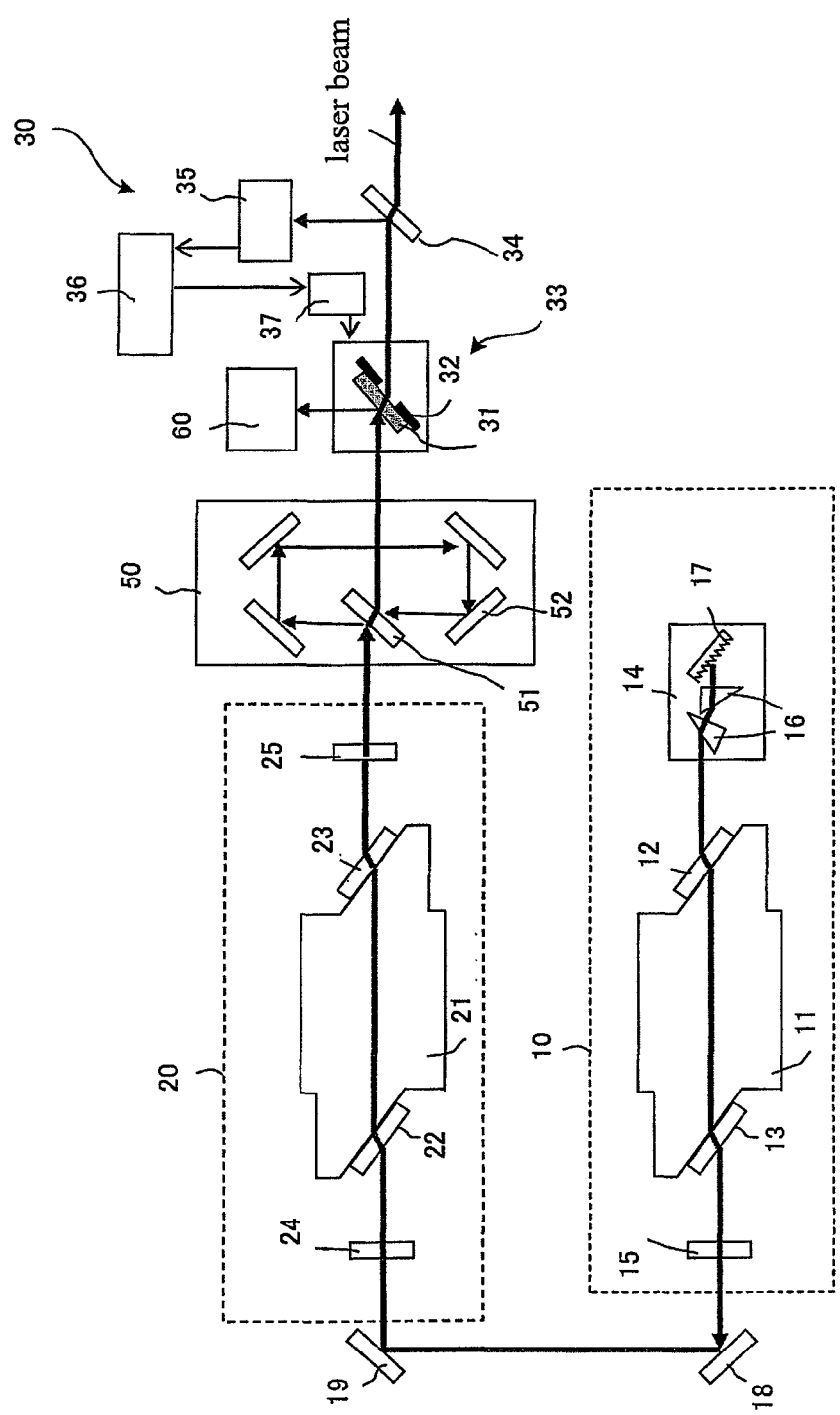
FIG. 19 is a schematic illustration of the system according to a third embodiment.
Figure 20:
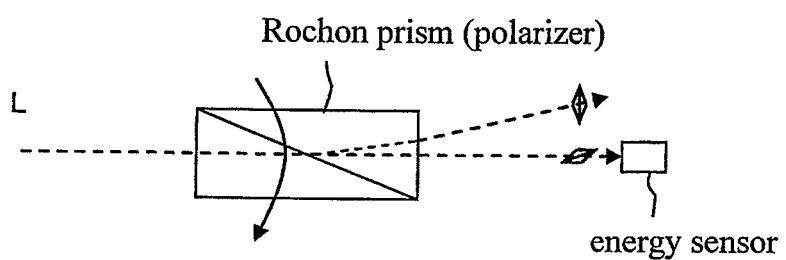
FIG. 20 is a schematic illustration of measurement of the intensity of transmitted light.

Now, a third embodiment of the present invention will be described below. The 2-stage laser system 1 of the third embodiment is provided with a monitor module 60 for measuring the laser output energy level, the spectrum width and the center wavelength as illustrated in FIG. 19, for instance. Additionally, the $CaF_2$ crystal substrate 31 of the degree of polarization control device 30 is made to take the role of a beam splitter for entering light into the monitor module 60. In this case, the incident angle is 45° but the characteristics for shifting the degree of polarization of laser beam is the same as the case of using the Brewster angle as an incident angle. Otherwise, the third embodiment has a configuration similar to the first embodiment and hence will not be described any further.

As the $CaF_2$ crystal substrate 31 of the degree of polarization control device 30 is made to take the role of a beam splitter for the monitor module 60, this embodiment has an advantage of reduced cost and a reduced space it requires. Instead of providing a beam splitter for the monitor module 60, a rotary mechanism for controlling polarization may be annexed to the transmission element arranged on the main optical axis of the system to achieve the same effect.

The quantity of variation of the phase difference due to transmission through the $CaF_2$ crystal substrate varies as a function of thermal stress when it is rigidly secured at a certain rotation angle θ. Therefore, when a command for shifting the energy level and the frequency is received, the rotational angle θ is preferably adjusted at the same time in order not to change the degree of polarization.

Furthermore, the quantity of variation of the phase difference also varies when the rotational angle is fixed and the incident angle is shifted. Therefore, it is also possible to control the incident angle instead of the rotational angle in order to control the degree of polarization. However, if such is the case, the optical axis will be shifted after the transmission so that preferably a compensation element is inserted before the laser beam enters an aligner in order to prevent the optical form being shifted and the compensation element is controlled at the same time. The rotational angle thereof is preferably set to θ=0° so that the degree of polarization may not vary as a result of transmission through the compensation element.

The quantity of variation of the phase difference as a result of transmission through the $CaF_2$ crystal substrate 31 varies according to the producer and the grade of the element. Therefore, an optimum element that is within the range to be desirably controlled is preferably selected.

While $CaF_2$ crystal cut along the (111) crystal face is employed in the above description, it is easily predictable that the degree of polarization will be shifted by using an element cut along some other crystal orientation and modifying the relationship between the optical axis of transmission and the crystal orientation. Therefore, when an element cut along some other crystal orientation is employed, the characteristics that become apparent when it is driven to rotate may be observed and the element may be controlled in a manner that is congruous with the characteristics.

While a MOPO type laser is described above, the present invention is equally applicable to lasers other than the MOPO type such as MOPA type lasers and ring amplification type lasers to provide similar advantages.

Additionally, while the present invention is applied to the optical axis downstream relative to an amplification stage in the above description, it is also possible to arrange a polarization control module 33 and a polarization monitor 35 downstream relative to an oscillation stage laser to control the degree of polarization of the seed laser beam.

Furthermore, while the present invention is described above in terms of $CaF_2$ crystal, $MgF_2$ crystal provides similar effects and hence the degree of polarization can be controlled by controlling the relationship between the optical axis of a laser beam transmitted through $MgF_2$ crystal and the crystal orientation.

While the present invention is described in terms of embodiments of degree of polarization control device 30, the present invention is by no means limited to those embodiments, which may be modified in various different ways without departing from the spirit and scope of the invention.

What is claimed is:

1. A gas laser comprising:
   an oscillating laser to output laser light;
   an amplifying laser containing laser gas and amplifying laser light output from the oscillating laser for output; and
   a polarization purity control device:
   the polarization purity control device including:
   a crystal substrate disposed on a light path of the laser light and tilted with respect to the light path;
   a polarization monitor to measure polarization purity of the laser light transmitted through the crystal substrate;
   a rotating stage to rotate the crystal substrate, through a rotation angle, about a crystal orientation axis of the crystal substrate; and
   a controller to control the rotation angle of the rotating stage based on a result of the measurement from the polarization monitor;
   wherein
   the controller is configured to control the rotating stage based on a rotational angle calculated based on a degree of polarization table which depicts the relationship between the rotational angle and a degree of polarization of an incident laser beam after being transmitted through the crystal.

2. The gas laser device according to claim 1, wherein the crystal substrate is a calcium fluoride crystal substrate.

3. The gas laser device according to claim 1, wherein the crystal substrate is a magnesium fluoride crystal substrate.

4. The gas laser device according to claim 1, wherein the polarization purity control device is disposed on the light path of the laser light output from the oscillating laser.

5. The gas laser device according to claim 1, wherein the polarization purity control device is disposed on the light path of the laser light output from the amplifying laser.

6. The gas laser device according to claim 1, wherein the rotating stage rotates the crystal substrate, though a rotation angle, about a <111> crystal orientation axis of the crystal substrate which differs from a direction of the light path.

* * * * *